(12) United States Patent
Shinozaki et al.

(10) Patent No.: US 12,297,784 B2
(45) Date of Patent: May 13, 2025

(54) CONTROL DEVICE FOR VARIABLE COMPRESSION RATIO MECHANISM, AND DIAGNOSTIC METHOD FOR SAME

(71) Applicant: Hitachi Astemo, Ltd., Hitachinaka (JP)

(72) Inventors: Yuya Shinozaki, Hitachinaka (JP); Akira Kiyomura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 18/281,240

(22) PCT Filed: Feb. 21, 2022

(86) PCT No.: PCT/JP2022/006888
§ 371 (c)(1),
(2) Date: Sep. 8, 2023

(87) PCT Pub. No.: WO2022/219924
PCT Pub. Date: Oct. 20, 2022

(65) Prior Publication Data
US 2024/0151187 A1 May 9, 2024

(30) Foreign Application Priority Data
Apr. 13, 2021 (JP) ................................ 2021-067603

(51) Int. Cl.
*F02D 15/02* (2006.01)
*F02D 41/22* (2006.01)

(52) U.S. Cl.
CPC ........... *F02D 15/02* (2013.01); *F02D 41/221* (2013.01); *F02D 2700/03* (2013.01)

(58) Field of Classification Search
USPC ............................................ 123/48 R, 48 A
See application file for complete search history.

(56) References Cited

U.S. PATENT DOCUMENTS

2006/0180118 A1  8/2006  Takemura et al.
2009/0062064 A1  3/2009  Kamada et al.
(Continued)

FOREIGN PATENT DOCUMENTS

JP  2002-22004 A  1/2002
JP  2006-226133 A  8/2006
(Continued)

OTHER PUBLICATIONS

Japanese-language Office Action issued in Japanese Application No. 2023-514365 dated Jan. 30, 2024 with English translation (10 pages).
(Continued)

*Primary Examiner* — George C Jin
*Assistant Examiner* — Teuta B Holbrook
(74) *Attorney, Agent, or Firm* — Crowell & Moring LLP

(57) ABSTRACT

A control device for a variable compression ratio mechanism for changing a compression ratio of an internal combustion engine by rotating a control shaft connected to an output shaft of an actuator, wherein with respect to a reference position, the control device determines the rotation angle of the control shaft by sequentially integrating the output values of an angle sensor that detects the rotation angle of the output shaft of the actuator in a range of 0° to 360° such that the rotation angle approaches a target angle. When the internal combustion engine is stopped, the control device rotates the control shaft to a high-compression-ratio side and a low-compression-ratio side, respectively, toward a stopper mechanism that defines the rotatable range and compares the determined rotation angle and a reference operation angle to diagnose whether a failure has occurred in the variable compression ratio mechanism.

14 Claims, 11 Drawing Sheets

(56) References Cited

U.S. PATENT DOCUMENTS

| | | |
|---|---|---|
| 2012/0242330 A1 | 9/2012 | Uchisasai et al. |
| 2018/0231392 A1* | 8/2018 | Kiyomura ................ G01D 3/08 |
| 2018/0259375 A1* | 9/2018 | Kiyomura .......... G05B 23/0256 |

FOREIGN PATENT DOCUMENTS

| | | |
|---|---|---|
| JP | 2009-58085 A | 3/2009 |
| JP | 2012-202861 A | 10/2012 |
| JP | 2020-2822 A | 1/2020 |

OTHER PUBLICATIONS

International Search Report (PCT/ISA/210) issued in PCT Application No. PCT/JP2022/006888 dated May 10, 2022 with English translation (4 pages).

Japanese-language Written Opinion (PCT/ISA/237) issued in PCT Application No. PCT/JP2022/006888 dated May 10, 2022 with English translation (7 pages).

International Preliminary Report on Patentability (PCT/IB/326, PCT/IB/338, and PCT/IB/373) issued in PCT Application No. PCT/JP2022/006888 dated Oct. 26, 2023, including Japanese-language Written Opinion (PCT/ISA/237) with English translation (11 pages).

* cited by examiner

CONTROL DEVICE FOR VARIABLE COMPRESSION RATIO MECHANISM, AND DIAGNOSTIC METHOD FOR SAME

TECHNICAL FIELD

The present invention relates to a control device for a variable compression ratio (VCR) mechanism for changing a compression ratio of an internal combustion engine, and relates to a diagnostic method for the same.

BACKGROUND ART

In the control of a VCR mechanism, a compression ratio sensor is used to detect a compression ratio from the rotation angle of the control shaft of a multiple linkage mechanism as described in Japanese Patent Publication Laid-Open No. 2006-226133 (Patent Document 1). The compression ratio sensor includes a relative angle sensor that detects the rotation angle of the output shaft of an actuator in a range of 0° to 360° and an absolute angle sensor that detects the absolute angle of a control shaft connected to the output shaft of the actuator. The output value of the absolute angle sensor is learned as a reference position at the start of an internal combustion engine, and then changes of the rotation angle of the control shaft are sequentially integrated to determine the rotation angle of the control shaft, the changes being determined from the output values of the relative angle sensor.

REFERENCE DOCUMENT LIST

Patent Document

Patent Document 1: JP 2006-226133 A

SUMMARY OF THE INVENTION

Problem to be Solved by the Invention

In order to achieve reduction in size of the VCR mechanism, it is conceivable to remove the absolute angle sensor used for learning the reference position at the start of the internal combustion engine. In this case, the reference position cannot be learned from the absolute angle sensor. Thus, by rotating the control shaft at the start of the internal combustion engine, the output value of the absolute angle sensor may be learned as the reference position while the control shaft is pressed to a mechanical stopper mechanism for defining the rotatable range of the control shaft. Thereafter, the rotation angle of the control shaft can be determined by sequentially integrating changes of the rotation angle of the control shaft with respect to the reference position learned thus, the changes being determined from the output values of the relative angle sensor.

However, if slipping occurs on the output shaft of the actuator or the control shaft fit in a member connected to the output shaft, the rotation angle of the control shaft is continuously changed even though the control shaft is pressed to the stopper mechanism, the rotation angle being determined from the output value of the relative angle sensor. In this case, the pressing of the control shaft to the stopper mechanism cannot be detected and the learning of the reference position is not normally completed. Thus, the rotation angle of the control shaft may include a relatively large error, resulting in improper control of the VCR mechanism.

Hence, an object of the present invention is to provide a control device for a VCR mechanism and a diagnostic method for the same, by which the presence or absence of a failure in the VCR mechanism can be diagnosed by using the output of an angle sensor for detecting the rotation angle of the output shaft of an actuator in a range of 0° to 360°.

Means for Solving the Problem

A control device for a VCR mechanism for changing a compression ratio of an internal combustion engine by rotating a control shaft connected to an output shaft of an actuator, in which with respect to a reference position, the control device determines the rotation angle of the control shaft by sequentially integrating the output values of an angle sensor that detects the rotation angle of the output shaft of the actuator in a range of 0° to 360°, the control device controlling the actuator such that the rotation angle of the control shaft approaches a target angle. When the internal combustion engine is stopped, the control device for the VCR mechanism rotates the control shaft to a high-compression-ratio side and a low-compression-ratio side toward a stopper mechanism that defines the rotatable range of the control shaft and compares the determined rotation angle of the control shaft and a reference operation angle to diagnose whether a failure has occurred in the variable compression ratio mechanism.

Effect of the Invention

The present invention can diagnose the presence or absence of a failure in the VCR mechanism by using the output of an angle sensor for detecting the rotation angle of the output shaft of an actuator in a range of 0° to 360°.

MODE FOR CARRYING OUT THE INVENTION

An embodiment for implementing the present invention will be specifically described below with reference to the accompanying drawings.

Figure 1:
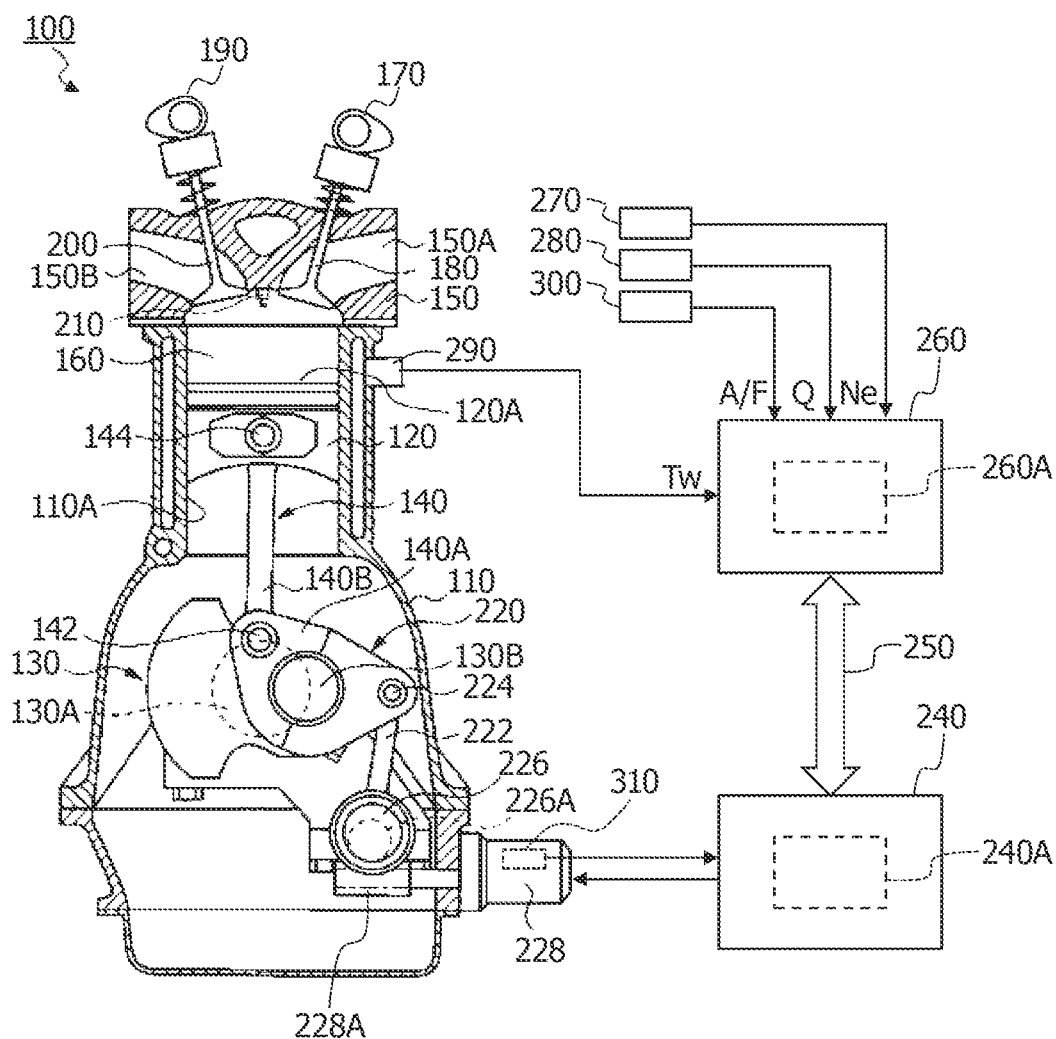
FIG. 1 is a schematic diagram illustrating an example of a control system for a four-cycle engine.

FIG. 1 illustrates an example of a control system for a four-cycle engine installed in vehicles such as an automobile.

An engine 100 (internal combustion engine) includes a cylinder block 110, a piston 120, a crankshaft 130, a connecting rod 140, and a cylinder head 150. Cylinder block 110 has a cylinder bore 110A in which piston 120 is fit and inserted in a reciprocating manner. In the lower part of cylinder block 110, crankshaft 130 is disposed so as to be relatively rotatable to cylinder block 110 via a bearing, which is not illustrated. Moreover, piston 120 is connected to crankshaft 130 so as to be relatively rotatable via connecting rod 140.

In cylinder head 150, an inlet port 150A for intaking air and an exhaust port 150B for exhausting air are formed. Cylinder head 150 is fastened to the top surface of cylinder block 110, so that an area determined by cylinder bore 110A of cylinder block 110, a crest surface 120A of piston 120, and the undersurface of cylinder head 150 acts as a combustion chamber 160. At an opening end of inlet port 150A facing combustion chamber 160, an inlet valve 180 to be opened and closed by an intake camshaft 170 is disposed. At an opening end of exhaust port 150B facing combustion chamber 160, an exhaust valve 200 to be opened and closed by an exhaust camshaft 190 is disposed.

At predetermined points in cylinder head 150 facing combustion chamber 160, an electromagnetic fuel injection valve (not illustrated) for injecting fuel into combustion chamber 160 is mounted, and an ignition plug 210 for igniting a mixture of fuel and intake air is mounted. The fuel injection valve is not limited to the configuration for directly injecting fuel into combustion chamber 160. The fuel injection valve may be configured to inject fuel into inlet port 150A or both of combustion chamber 160 and inlet port 150A.

Engine 100 further includes a VCR mechanism 220 that changes the capacity of combustion chamber 160 to have a variable compression ratio. For example, as disclosed in Japanese Patent Laid-Open No. 2006-226133, VCR mechanism 220 continuously varies the compression ratio of engine 100 by changing the capacity of combustion chamber 160 with a multiple linkage mechanism. An example of VCR mechanism 220 will be described below.

Crankshaft 130 includes a plurality of journal portions 130A and a plurality of crank-pin portions 130B. Journal portions 130A are rotatably supported by the main bearing (not illustrated) of cylinder block 110. Crank-pin portions 130B are decentered from journal portions 130A. A lower link 140A of connecting rod 140 is rotatably connected to crank-pin portions 130B. An upper link 140B of connecting rod 140 has the lower-end side rotatably connected to one end of lower link 140A with a connecting pin 142 and the upper end side rotatably connected to piston 120 with a piston pin 144. A control link 222 has the upper end side rotatably connected to the other end side of lower link 140A with a connecting pin 244 and the lower end side rotatably connected to the lower part of cylinder block 110 via a control shaft 226. Specifically, control shaft 226 includes an eccentric cam portion 226A that is rotatably supported by cylinder block 110 and is decentered from the rotation center of control shaft 226. The lower end side of control link 222 is rotatably fit into eccentric cam portion 226A. The rotation position of control shaft 226 is controlled by an actuator 228 for controlling a compression ratio with an electric motor.

In VCR mechanism 220 configured using the multiple linkage mechanism, a rotation of control shaft 226 by actuator 228 changes the center position of eccentric cam portion 226A, that is, the position relative to cylinder block 110. With this configuration, a change of a swinging support position at the lower end of control link 222 raises or lowers the position of piston 120 at the top dead center (TDC) of the piston so as to increase or reduce the capacity of combustion chamber 160, thereby changing the compression ratio of engine 100. At this point, if the operation of actuator 228 is stopped, a combustion pressure of air-fuel mixture in combustion chamber 160 rotates control link 222 relative to eccentric cam portion 226A of control shaft 226, so that the compression ratio of engine 100 changes to a low-compression-ratio side.

Figure 2:
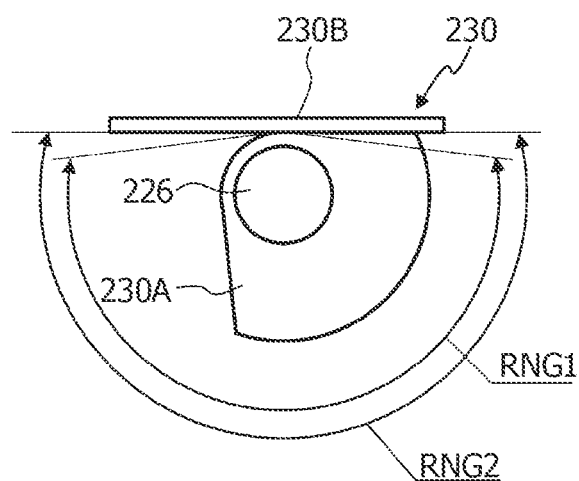
FIG. 2 is a partially enlarged view illustrating an example of a stopper mechanism.

At a predetermined point of VCR mechanism 220, as illustrated in FIG. 2, a stopper mechanism 230 is mounted. When control shaft 226 rotates beyond a normal control range RNG1, stopper mechanism 230 restricts the displacement (angle) to define a mechanically rotatable range RNG2. Stopper mechanism 230 includes a first member 230A substantially shaped like a fan with the main part fixed to control shaft 226, and a second member 230B shaped like a plate fixed to cylinder block 110. First member 230A rotates integrally with control shaft 226. When control shaft 226 rotates beyond a maximum compression ratio (upper limit) or a minimum compression ratio (lower limit) of normal control range RNG1, second member 230B comes into contact with one of two sides determining the central angle of first member 230A and restricts the displacement of control shaft 226. In this case, stopper mechanism 230 functions when control shaft 226 exceeds normal control range RNG1. Thus, first member 230A and second member 230B do not come into contact with each other in normal control, thereby suppressing, for example, the generation of unusual noise. Moreover, as will be specifically described later, stopper mechanism 230 is used for learning the reference position of control shaft 226 as well as a restriction on the displacement of control shaft 226.

For the rotation of control shaft 226, stopper mechanism 230 only needs to restrict a displacement on at least one of the maximum-compression-ratio side and the minimum-compression-ratio side. Furthermore, stopper mechanism 230 may restrict the displacement of control shaft 266 not only with first member 230A substantially shaped like a fan and second member 230B shaped like a plate, but also with two or more members having any shape.

VCR mechanism 220 is electronically controlled by a VCR controller 240 including a microcomputer 240A. For example, VCR controller 240 is connected to an engine controller 260, which electronically controls engine 100 and includes a microcomputer 260A, via a CAN (Controller Area Network) 250 illustrated as an example of an on-vehicle network. Thus, VCR controller 240 and engine controller 260 can transmit and receive any data to and from each other by using CAN 250. The on-vehicle network is not limited to CAN 250, but instead known networks such as FlexRay® can be used. In this configuration, VCR controller 240 is illustrated as an example of a control device.

Engine controller 260 receives the output signals of a rotation speed sensor 270 that detects a rotation speed Ne of engine 100, a load sensor 280 that detects a load Q of engine 100, a water temperature sensor 290 that detects a water temperature (coolant temperature) Tw of engine 100, and an air-fuel ratio sensor 300 that detects an air-fuel ratio A/F in exhaust gas. In this case, load Q of engine 100 may be a state quantity closely related to a requested torque of engine 100, for example, an intake-air flow rate, an intake-air negative pressure, a supercharged pressure, an acceleration opening, or a throttle opening. Engine controller 260 may read rotation speed Ne, load Q, water temperature Tw, and air-fuel ratio A/F of engine 100 from other controllers (not illustrated) connected via CAN 250.

Engine controller 260 reads rotation speed Ne and load Q from rotation speed sensor 270 and load sensor 280, respectively, and calculates a basic fuel injection quantity corresponding to an engine operating state on the basis of rotation speed Ne and load Q. Moreover, engine controller 260 reads water temperature Tw from water temperature sensor 290 and calculates a fuel injection quantity by correcting the basic fuel injection quantity at water temperature Tw. Furthermore, engine controller 260 calculates fuel injection timing and ignition timing on the basis of rotation speed Ne, load Q, and the fuel injection quantity.

When the rotation angle of crankshaft 130 reaches the fuel injection timing, engine controller 260 outputs a control signal corresponding to the fuel injection quantity to the fuel injection valve and injects fuel into combustion chamber 160 from the fuel injection valve. When the rotation angle of crankshaft 130 reaches the ignition timing, engine controller 260 outputs an actuation signal to ignition plug 210 and ignites a mixture of fuel and intake air. At this point, engine controller 260 reads air-fuel ratio A/F from air-fuel ratio sensor 300 and performs feedback control on the fuel injection valve such that air-fuel ratio A/F in exhaust gas approaches a target air-fuel ratio.

In addition to the control of the fuel injection valve and ignition plug 210, engine controller 260 reads rotation speed Ne and load Q from rotation speed sensor 270 and load sensor 280, respectively, and calculates a target compression ratio of VCR mechanism 220 according to rotation speed Ne and load Q, in short, a target angle of control shaft 226 of VCR mechanism 220. Engine controller 260 then transmits the target angle to VCR controller 240 via CAN 250.

VCR controller 240 having received the target angle of control shaft 226 performs feedback control on a driving current to be output to actuator 228 of VCR controller 240, the feedback control being performed such that an actual rotation angle (actual angle) of control shaft 226 approaches the target angle. Hence, VCR mechanism 220 can be controlled at the target angle corresponding to the operating state of engine 100, thereby improving, for example, a power output and fuel efficiency.

Figure 3:
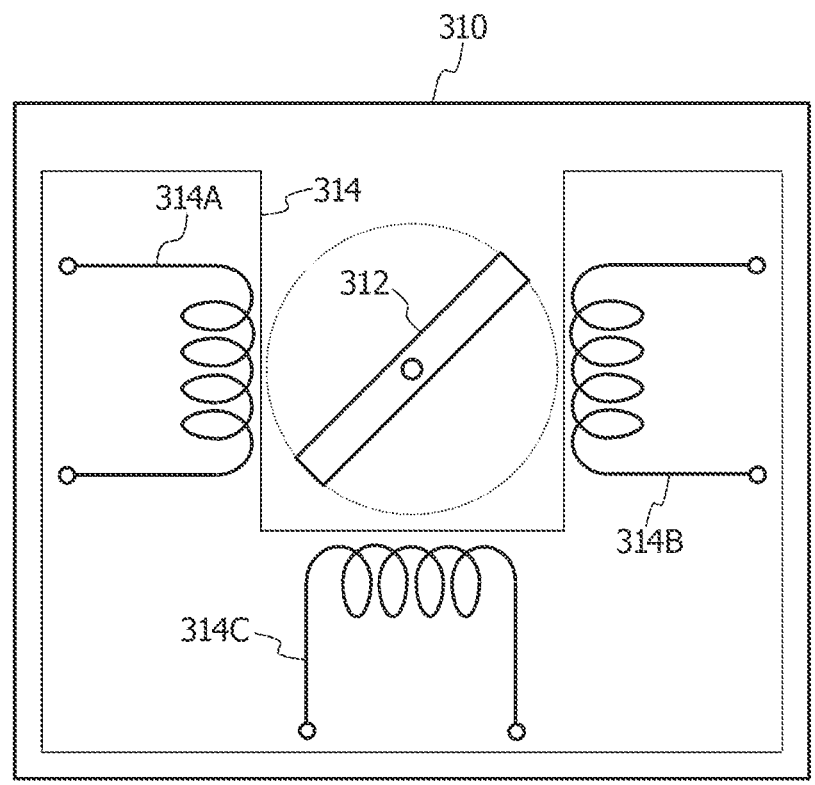
FIG. 3 is a structural drawing illustrating an example of a resolver.
Figure 4:
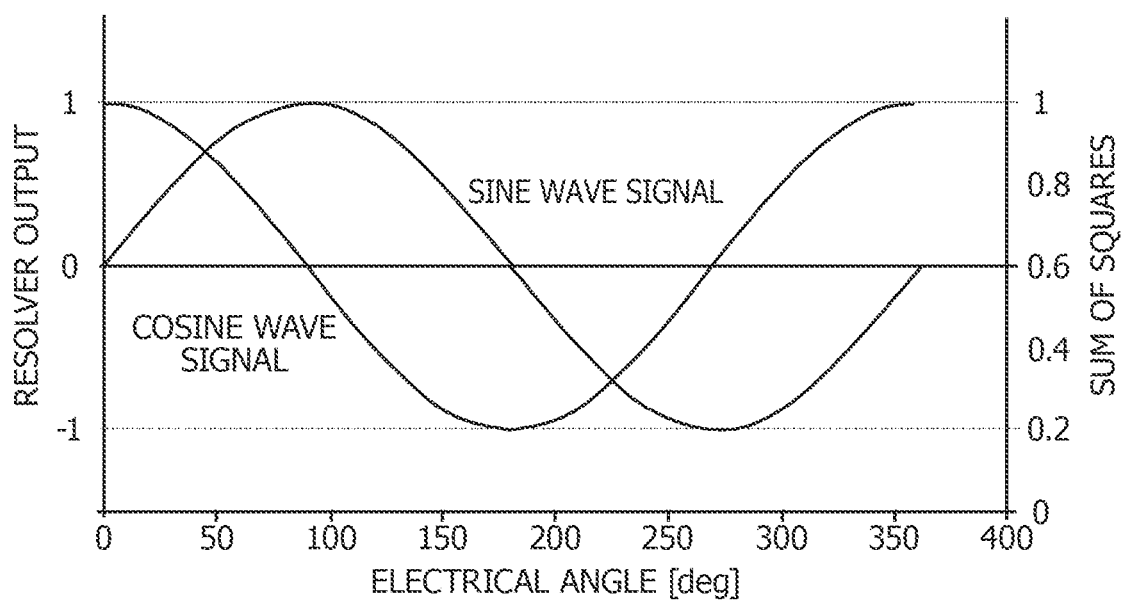
FIG. 4 is an explanatory drawing illustrating an example of a resolver output.

For this purpose, a resolver 310 for detecting the rotation angle of the output shaft of actuator 228 in a range of 0° to 360° is mounted in actuator 228. Resolver 310 outputs two signals correlated according to the rotation angle of the output shaft of actuator 228, specifically, a sine wave signal and a cosine wave signal. As illustrated in FIG. 3, resolver 310 includes a rotor 312 that rotates integrally with the output shaft of actuator 228 and a stator 314 around which a one-phase exciting coil 314A and two-phase output coils 314B and 314C are wound. Two-phase output coils 314B and 314C of stator 314 are disposed with a phase difference of 90° with respect to the output shaft of actuator 228. When an excitation signal including an AC current is output to exciting coil 314A of stator 314, as indicated in FIG. 4, a two-phase voltage including the sine wave signal and the cosine wave signal is generated on output coils 314B and 314C, the two-phase signal changing according to the rotation angle (electrical angle) of the output shaft of actuator 228. In this case, resolver 310 is illustrated as an example of the angle sensor.

VCR controller 240 can determine the rotation angle of the output shaft of actuator 228 by calculating the arctangent of the sine wave signal and the cosine wave signal that are outputted from resolver 310. Moreover, VCR controller 240 can also calculate the sum of squares ($\sin^2\theta+\cos^2\theta$) of the sine wave signal and the cosine wave signal that are output from resolver 310, and diagnose the presence or absence of a failure in resolver 310 depending on whether the sum of squares is within a normal range.

Resolver 310 detects the rotation angle of the output shaft of actuator 228 in a range of 0° to 360° and thus cannot define the actual angle of control shaft 226 connected to the output shaft via a reducer 228A. Thus, at the start of engine 100, VCR controller 240 controls actuator 228 to press first member 230A of stopper mechanism 230 to second member 230B thereof and learns a rotation angle as a reference position at this moment. Thereafter, for a deviation of a relative angle determined from the two temporally consecutive outputs of resolver 310, VCR controller 240 calculates a change of the angle of control shaft 226 in consideration of the reduction ratio of reducer 228A and determines the rotation angle of control shaft 226 by sequentially integrating changes of the angle with respect to the reference position. VCR controller 240 then performs feedback control on actuator 228 of VCR mechanism 220 such that the rotation angle of control shaft 226 approaches the target angle.

However, if slipping occurs on control shaft 226 fit in the output shaft of reducer 228A, the rotation angle of control shaft 226 is continuously changed even though control shaft 226 is pressed to stopper mechanism 230, the rotation angle being determined from the output signals of resolver 310 and the reference position. Thus, the pressing of control shaft 226 to stopper mechanism 230 cannot be detected and the learning of the reference position is not normally completed. Thus, the rotation angle of control shaft 226 may include a relatively large error, resulting in improper control of VCR mechanism 220.

For this reason, at least when engine 100 is stopped, VCR controller 240 rotates control shaft 226 to a high-compression-ratio side and a low-compression-ratio side toward stopper mechanism 230. VCR controller 240 then compares the rotation angle of control shaft 226 and a reference operation angle and diagnoses the presence or absence of a failure in VCR mechanism 220. In this case, the reference operation angle is information with which it is possible to determine rotatable range RNG2 of control shaft 226, the rotatable range RNG2 being specified by stopper mechanism 230. The reference operation angle includes, for example, the maximum mechanical operation angle of control shaft 226. The control will be specifically described below.

Figure 5:
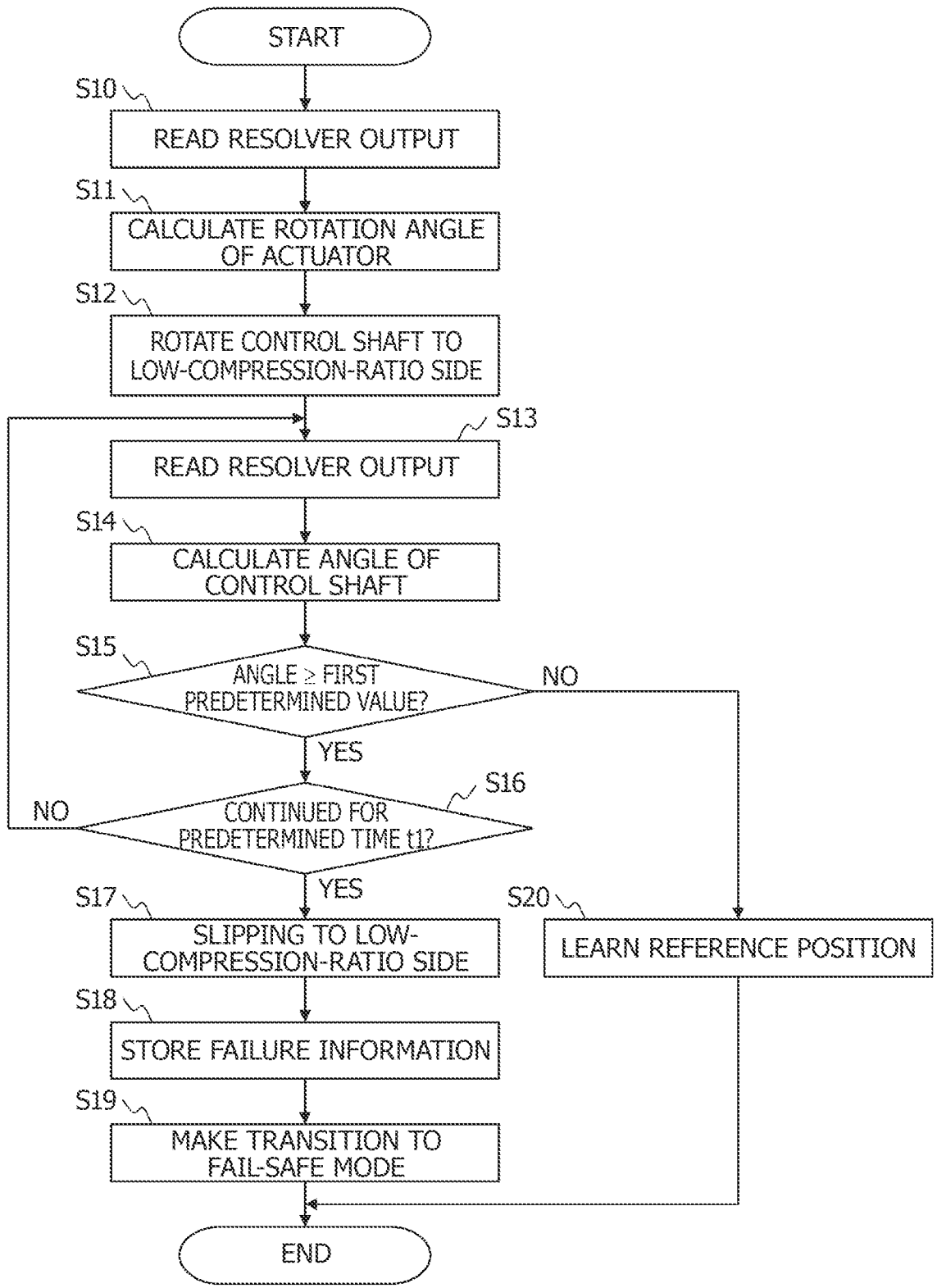
FIG. 5 is a flowchart showing an example of start processing.

FIG. 5 indicates an example of start processing performed by microcomputer 240A of VCR controller 240 in response to the start of engine 100. Microcomputer 240A of VCR controller 240 performs the start processing according to an application program stored in nonvolatile memory.

In step 10 (abbreviated to "S10" in FIG. 5; the same applies hereinafter), microcomputer 240A of VCR controller 240 reads the output signals of resolver 310, specifically, the sine wave signal and the cosine wave signal that correspond to the electrical angle of rotor 312 integrated with the output shaft of actuator 228.

In step 11, microcomputer 240A of VCR controller 240 determines the rotation angle of the output shaft of actuator 228 from the arctangent of the sine wave signal and the cosine wave signal that are read from resolver 310 in step 10.

In step 12, microcomputer 240A of VCR controller 240 rotates control shaft 226 to the low-compression-ratio side by outputting a driving signal to actuator 228 of VCR mechanism 220. At this moment, for example, microcomputer 240A of VCR controller 240 controls the rotation of actuator 228 by speed feedback control (the same applies hereinafter).

In step 13, microcomputer 240A of VCR controller 240 reads the output signals of resolver 310 (sine wave signal and cosine wave signal).

In step 14, microcomputer 240A of VCR controller 240 calculates the rotation angle of control shaft 226. Specifically, microcomputer 240A of VCR controller 240 determines the rotation angle of actuator 228 from the arctangent of the sine wave signal and the cosine wave signal that are read from resolver 310 in step S13, and calculates a change of the angle from the just previously calculated rotation angle of actuator 228. Thereafter, microcomputer 240A of VCR controller 240 calculates a change of the angle of control shaft 226 in consideration of the reduction ratio of reducer 228A and determines the rotation angle of control shaft 226 by sequentially integrating changes of the angle with respect to the reference position of control shaft 226. In this case, the rotation angle of control shaft 226 is set at 0°, for example, in a state in which control shaft 226 rotates to the high-compression-ratio side and the displacement is restricted by stopper mechanism 230. The rotation angle of control shaft 226 gradually increases therefrom to the low-compression-ratio side.

In step 15, microcomputer 240A of VCR controller 240 determines whether the rotation angle of control shaft 226 is equal to or greater than a first predetermined value. In this case, the first predetermined value is a threshold value for diagnosing the presence or absence of slipping to the low-compression-ratio side. For example, the first predetermined value is properly set by adding a correction value to rotatable range RNG2 (reference operation angle) of control shaft 226 in consideration of variations among components, the rotatable range being specified by stopper mechanism 230. Rotatable range RNG2 of control shaft 226 may be set as, for example, a measured value at the time of shipment in consideration of variations. The correction value is properly set by integrating, for example, tolerances of the components of VCR mechanism 220. When determining that the rotation angle of control shaft 226 is equal to or greater than the first predetermined value, that is, control shaft 226 has rotated over stopper mechanism 230 to the low-compression-ratio side (Yes), microcomputer 240A of VCR controller 240 advances the processing to step 16. When determining that the rotation angle of control shaft 226 is less than the first predetermined value, that is, control shaft 226 has not rotated over stopper mechanism 230 to the low-compression-ratio side (No), microcomputer 240A of VCR controller 240 advances the processing to step 20. In this case, the rotation of control shaft 226 over stopper mechanism 230 to the low-compression-ratio side does not mean an actual event, but an event that may occur under the control (the same applies hereinafter).

In step 16, microcomputer 240A of VCR controller 240 determines whether the rotation angle of control shaft 226 has been kept at the first predetermined value or greater for a predetermined time t1 by using, for example, the timing function of a timer or the like. In this case, predetermined time t1 is a threshold value for preventing a wrong diagnosis caused by noise superimposition or the like. Predetermined time t1 is properly set in consideration of, for example, the resolution of resolver 310 and an angle calculation error. When determining that the rotation angle of control shaft 226 has been kept at the first predetermined value or greater for predetermined time t1 (Yes), microcomputer 240A of VCR controller 240 advances the processing to step 17. When determining that the rotation angle of control shaft 226 has not been kept at the first predetermined value or greater for predetermined time t1 (No), microcomputer 240A of VCR controller 240 returns the processing to step 13.

In step 17, the rotation angle of control shaft 226 has been kept at the first predetermined value or greater for predetermined time t1. Thus, for example, microcomputer 240A of VCR controller 240 diagnoses that control shaft 226 is insufficiently fixed to the output shaft of reducer 228A and slipping has occurred on control shaft 226 to the low-compression-ratio side.

In step 18, microcomputer 240A of VCR controller 240 writes and stores failure information, with which it is possible to determine the occurrence of slipping on control shaft 226 to the low-compression-ratio side, in nonvolatile memory, e.g., EEPROM (Electrically Erasable Read Only Memory).

In step 19, microcomputer 240A of VCR controller 240 causes the control of VCR mechanism 220 to make a transition to a fail-safe mode. In this case, in the fail-safe mode of VCR mechanism 220, for example, control shaft 226 can be rotated in a predetermined restricted range or can be held on the low-compression-ratio side. Thereafter, microcomputer 240A of VCR mechanism 220 terminates the start processing.

In step 20, control shaft 226 is not rotating over stopper mechanism 230, so that microcomputer 240A of VCR controller 240 learns, as a reference position, a value obtained by subtracting a reference operation amount from the rotation angle of control shaft 226 in this state. Microcomputer 240A of VCR controller 240 then terminates the start processing.

Figure 6:
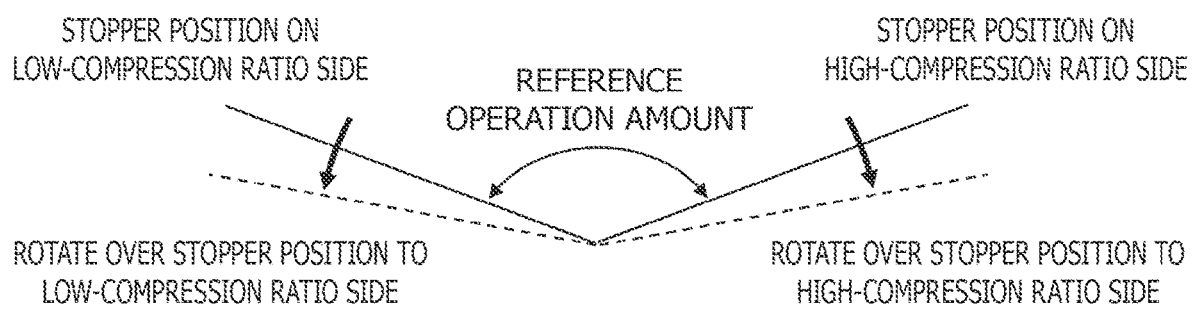
FIG. 6 is an explanatory drawing of a state in which slipping occurs on a control shaft.

According to the start processing, microcomputer 240A of VCR controller 240 rotates control shaft 226 to the low-compression-ratio side and determines whether the rotation angle of control shaft 226 have been kept at the first predetermined value or greater for predetermined time t1, the rotation angle being determined from the output signals of resolver 310 and the reference position. When the rotation angle of control shaft 226 is equal to or greater than the first predetermined value, as indicated in FIG. 6, it is assumed that control shaft 226 has rotated over stopper mechanism 230 to the low-compression-ratio side under the control. In this state, although control shaft 226 has not actually rotated over stopper mechanism 230, for example, it is assumed that control shaft 226 is slipping with respect to the output shaft of reducer 228A. If control shaft 226 is slipping with respect to the output shaft of reducer 228A, failure information with which it is possible to determine the slipping is stored in the nonvolatile memory, and the control of VCR mechanism 220 makes a transition to the fail-safe mode in order to secure safety in a vehicle operation.

If control shaft 226 is not slipping with respect to the output shaft of reducer 228A, the reference position is learned by subtracting a reference operation amount from the rotation angle of control shaft 226 in a state in which the rotation of control shaft 226 to the low-compression ratio side is restricted by stopper mechanism 230. The diagnosis and the learning of the reference position are performed with control shaft 226 changed to the low-compression-ratio side in preparation for a restart when engine 100 is stopped. This can reduce a time for diagnosing slipping of control shaft 226, thereby shortening a time from the start to cranking of engine 100.

Figure 7:
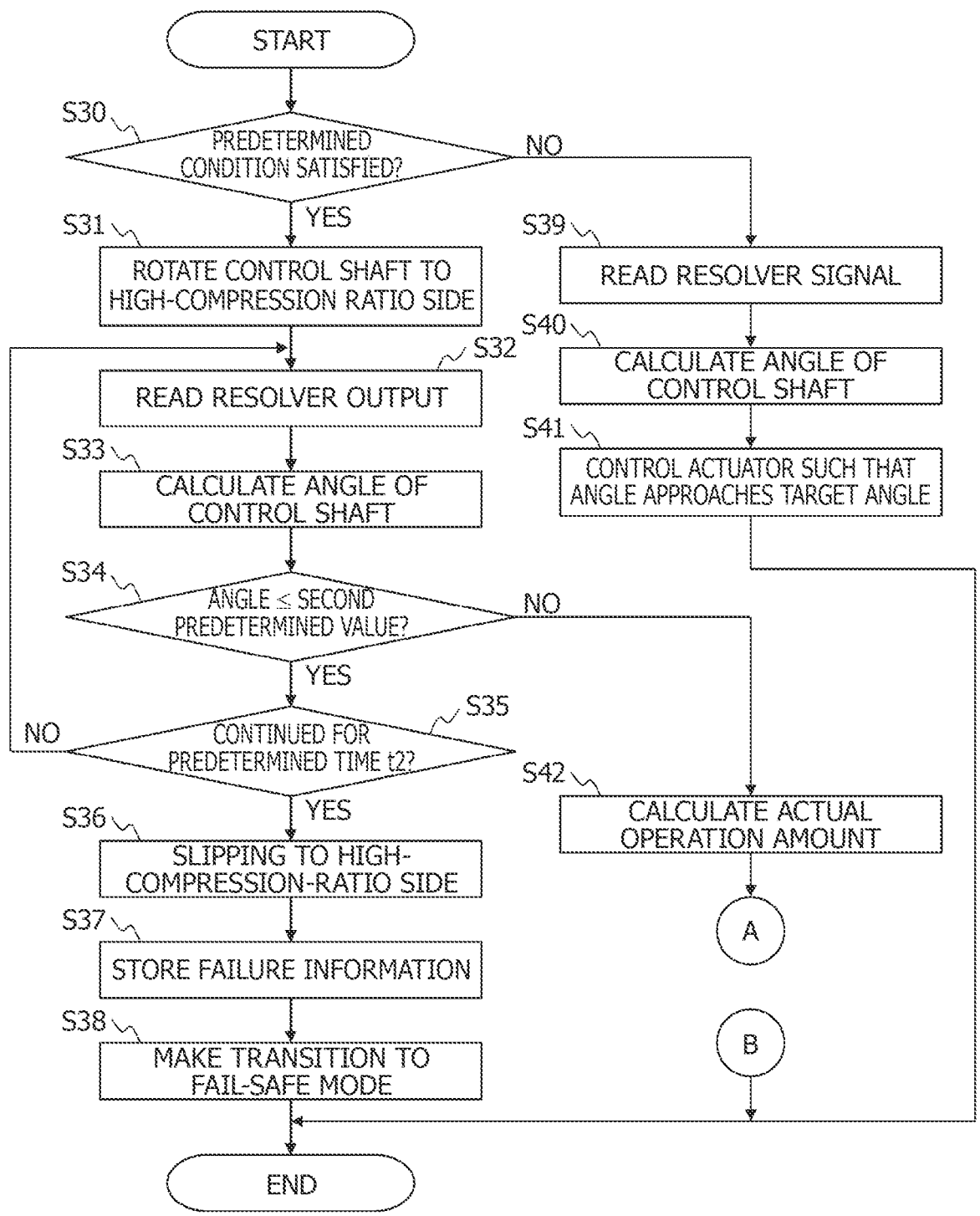
FIG. 7 is a flowchart showing an example of normal processing.
Figure 8:
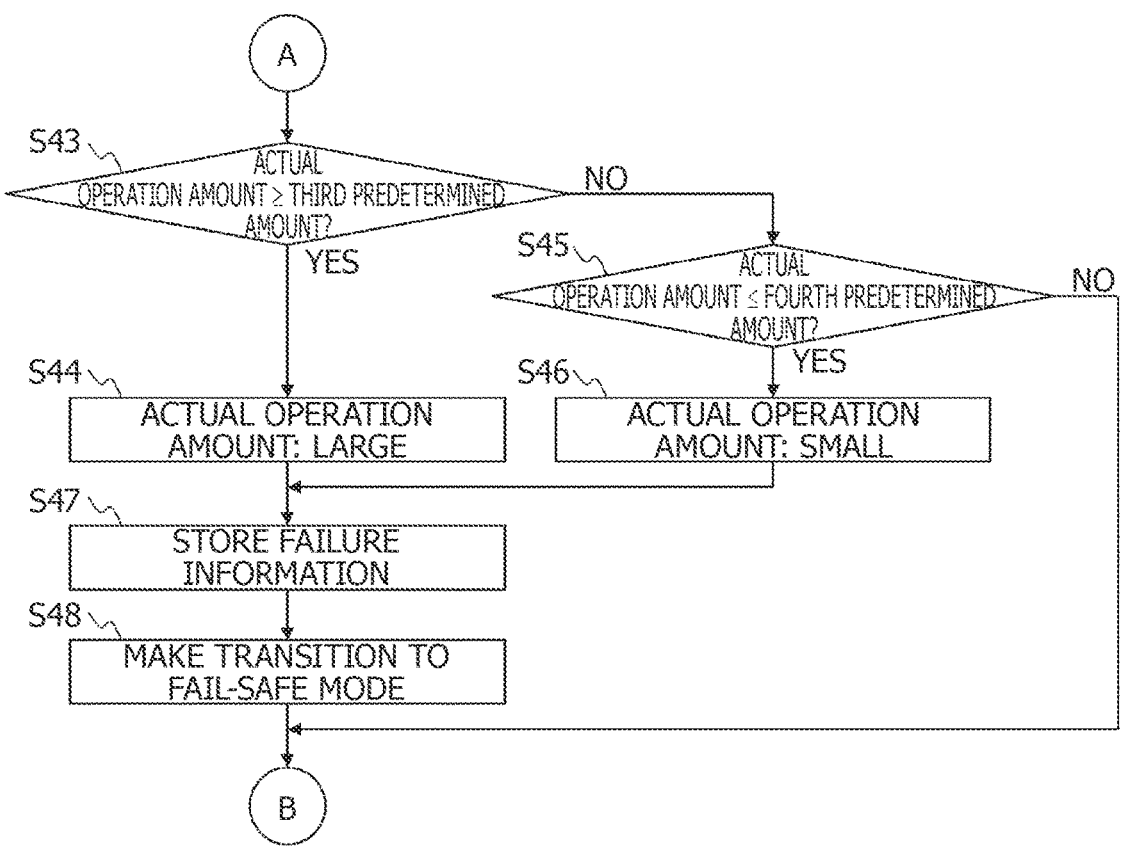
FIG. 8 is a flowchart showing the example of the normal processing.

FIGS. 7 and 8 indicate an example of normal processing performed when VCR controller 240 receives the target angle of a control shaft 266 from engine controller 260 after engine 100 is cranked to start. Microcomputer 240A of VCR controller 240 performs the normal processing according to an application program stored in the nonvolatile memory. In the following description, the same processing as in the start processing of FIG. 5 will be simply described to avoid an overlap (the same applies hereinafter). See the above description for reference when necessary (the same applies hereinafter).

In step 30, microcomputer 240A of VCR controller 240 determines whether a predetermined condition for diagnosing VCR mechanism 220 is satisfied. In this case, the predetermined condition can be, for example, a condition in which the requested torque of engine 100 is reduced and control shaft 226 has reached the maximum compression ratio of normal control range RNG1. When determining that the predetermined condition is satisfied (Yes), microcomputer 240A of VCR controller 240 advances the processing to step 31. When determining that the predetermined condition is not satisfied (No), microcomputer 240A of VCR controller 240 advances the processing to step 39.

In step 31, microcomputer 240A of VCR controller 240 rotates control shaft 226 to the high-compression-ratio side by outputting a driving signal to actuator 228 of VCR mechanism 220.

In step 32, microcomputer 240A of VCR controller 240 reads the output signals of resolver 310 (sine wave signal and cosine wave signal).

In step 33, microcomputer 240A of VCR controller 240 determines the rotation angle of control shaft 226 from the output signals of resolver 310 and the reference position.

In step 34, microcomputer 240A of VCR controller 240 determines whether the rotation angle of control shaft 226 is equal to or less than a second predetermined value. In this case, the second predetermined value is a threshold value for diagnosing the presence or absence of slipping to the high-compression-ratio side. For example, the second predetermined value is a negative value properly set in consideration of variations among components. When determining that the rotation angle of control shaft 226 is equal to or less than the second predetermined value, that is, control shaft 226 has rotated over stopper mechanism 230 to the high-compression-ratio side (Yes), microcomputer 240A of VCR controller 240 advances the processing to step 35. When determining that the rotation angle of control shaft 226 is greater than the second predetermined value, that is, control shaft 226 has not rotated over stopper mechanism 230 to the high-compression-ratio side (No), microcomputer 240A of VCR controller 240 advances the processing to step 42.

In step 35, microcomputer 240A of VCR controller 240 determines whether the rotation angle of control shaft 226 has been kept at the second predetermined value or less for a predetermined time t2. In this case, predetermined time t2 is a threshold value for preventing an incorrect diagnosis caused by noise superimposition or the like. Predetermined time t2 is properly set in consideration of, for example, the resolution of resolver 310 and an angle calculation error. When determining that the rotation angle of control shaft 226 has been kept at the second predetermined value or less for predetermined time t2 (Yes), microcomputer 240A of VCR controller 240 advances the processing to step 36. When determining that the rotation angle of control shaft 226 has not been kept at the second predetermined value or less for predetermined time t2 (No), microcomputer 240A of VCR controller 240 returns the processing to step 32.

In step 36, the rotation angle of control shaft 226 has been kept at the second predetermined value or less for predetermined time t2. Thus, for example, microcomputer 240A of VCR controller 240 diagnoses that control shaft 226 is insufficiently fixed to the output shaft of reducer 228A and slipping has occurred on control shaft 226 to the high-compression-ratio side.

In step 37, microcomputer 240A of VCR controller 240 writes and stores failure information, with which it is possible to determine the occurrence of slipping on control shaft 226 to the high-compression-ratio side, in nonvolatile memory.

In step 38, microcomputer 240A of VCR controller 240 causes the control of VCR mechanism 220 to make a transition to the fail-safe mode. Thereafter, microcomputer 240A of VCR controller 240 terminates the normal processing in the current control cycle.

In step 39, microcomputer 240A of VCR controller 240 reads the output signals of resolver 310 (sine wave signal and cosine wave signal).

In step 40, microcomputer 240A of VCR controller 240 determines the rotation angle of control shaft 226 from the output signals of resolver 310 and the reference position.

In step 41, microcomputer 240A of VCR controller 240 controls actuator 228 by, for example, feedback control such that the rotation angle of control shaft 226 approaches the target angle. Thereafter, microcomputer 240A of VCR controller 240 terminates the normal processing in the current control cycle.

In step 42, control shaft 226 is not rotating over stopper mechanism 230 to the high-compression-ratio side, so that microcomputer 240A of VCR controller 240 calculates the actual operation amount of control shaft 226, the actual operation amount being correlated with rotatable range RNG2 of control shaft 226, the rotatable range RNG2 being restricted by stopper mechanism 230. Specifically, since a reference position (O) on the low-compression-ratio side is determined by learning, microcomputer 240A of VCR controller 240 calculates, as an actual operation amount, a rotation angle in a state in which the rotation of control shaft 226 to the high-compression-ratio side is restricted by stopper mechanism 230.

In step 43, microcomputer 240A of VCR controller 240 determines whether the actual operation amount of control shaft 226 is equal to or greater than a third predetermined value. In this case, the third predetermined value is a threshold value for diagnosing whether the actual operation amount of control shaft 226 is too great. For example, the third predetermined value is properly set by adding a correction value to the reference operation amount in consideration of variations among components. The correction value is properly set by integrating, for example, tolerances of the components of VCR mechanism 220. When determining that the actual operation amount of control shaft 226 is equal to or greater than the third predetermined value (Yes), microcomputer 240A of VCR controller 240 advances the processing to step 44. When determining that the actual operation amount of control shaft 226 is less than the third predetermined value (No), microcomputer 240A of VCR controller 240 advances the processing to step 45.

In step 44, since the actual operation amount of control shaft 226 is equal to or greater than the third predetermined value, microcomputer 240A of VCR controller 240 diagnoses that the actual operation amount of control shaft 226 is too large. Thereafter, microcomputer 240A of VCR controller 240 advances the processing to step 47.

In step 45, microcomputer 240A of VCR controller 240 determines whether the actual operation amount of control shaft 226 is equal to or less than a fourth predetermined value. In this case, the fourth predetermined value is a threshold value for diagnosing whether the actual operation amount of control shaft 226 is too small. For example, the fourth predetermined value is properly set by adding a correction value to the reference operation amount in consideration of variations among components. The correction value is properly set by integrating, for example, tolerances of the components of VCR mechanism 220. When determining that the actual operation amount of control shaft 226 is equal to or less than the fourth predetermined value (Yes), microcomputer 240A of VCR controller 240 advances the processing to step 46. When determining that the actual operation amount of control shaft 226 is greater than the fourth predetermined value (No), microcomputer 240A of VCR controller 240 terminates the normal processing in the current control cycle.

In step 46, since the actual operation amount of control shaft 226 is equal to or less than the fourth predetermined value, microcomputer 240A of VCR controller 240 diagnoses that the actual operation amount of control shaft 226 is too small. Thereafter, microcomputer 240A of VCR controller 240 advances the processing to step 47.

In step 47, microcomputer 240A of VCR controller 240 writes and stores failure information, with which it is possible to determine that the actual operation amount of control shaft 226 is too large or too small, in nonvolatile memory.

In step 48, microcomputer 240A of VCR controller 240 causes the control of VCR mechanism 220 to make a transition to the fail-safe mode. Thereafter, microcomputer 240A of VCR controller 240 terminates the normal processing in the current control cycle.

According to the normal processing, microcomputer 240A of VCR controller 240 rotates control shaft 226 to the high-compression-ratio side when the compression ratio of engine 100 reaches the maximum compression ratio in normal control range RNG1. Thereafter, microcomputer 240A of VCR controller 240 determines whether the rotation angle of control shaft 226 has been kept at the second predetermined value or less for the predetermined time t2, the rotation angle being determined from the output signals of resolver 310 and the reference position. When the rotation angle of control shaft 226 is equal to or less than the second predetermined value, as indicated in FIG. 6, it is assumed that control shaft 226 has rotated over stopper mechanism 230 to the low-compression-ratio side under the control. In this state, although control shaft 226 has not actually rotated over stopper mechanism 230, for example, it is assumed that control shaft 226 is slipping with respect to the output shaft of reducer 228A. If control shaft 226 is slipping with respect to the output shaft of reducer 228A, failure information with which it is possible to determine the slipping is stored in the nonvolatile memory, and the control of VCR mechanism 220 makes a transition to the fail-safe mode in order to secure safety in a vehicle operation.

Figure 9:
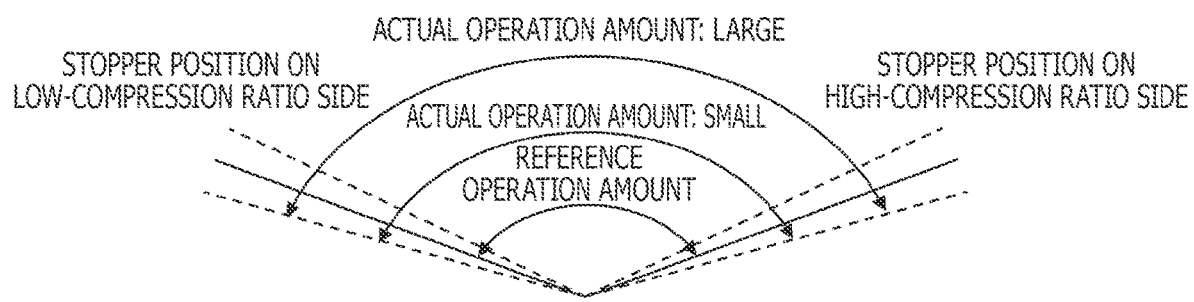
FIG. 9 is an explanatory drawing of a state in which the actual operation amount of the control shaft exceeds a reference operation amount.
Figure 10:
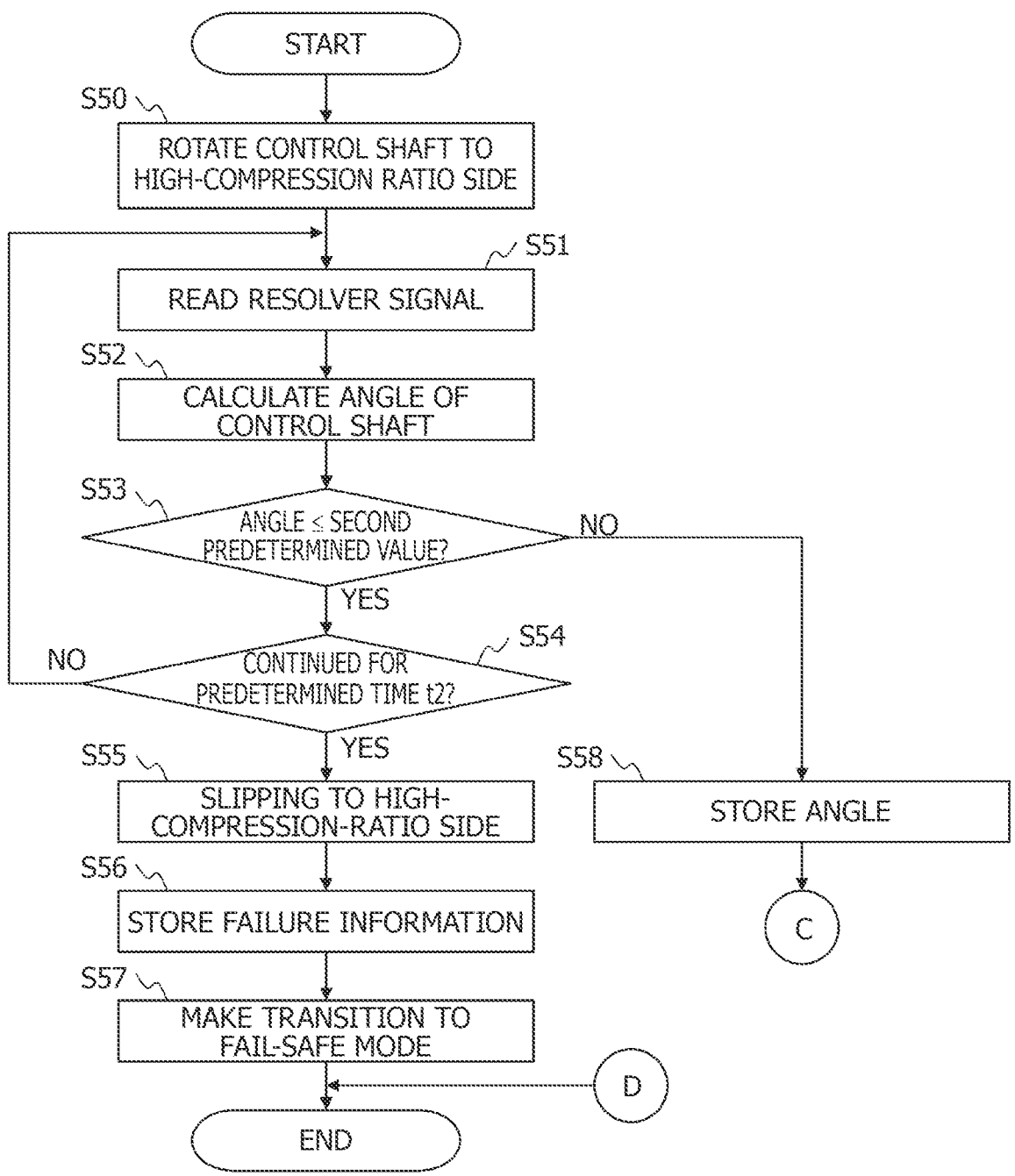
FIG. 10 is a flowchart showing an example of stop processing.
Figure 11:
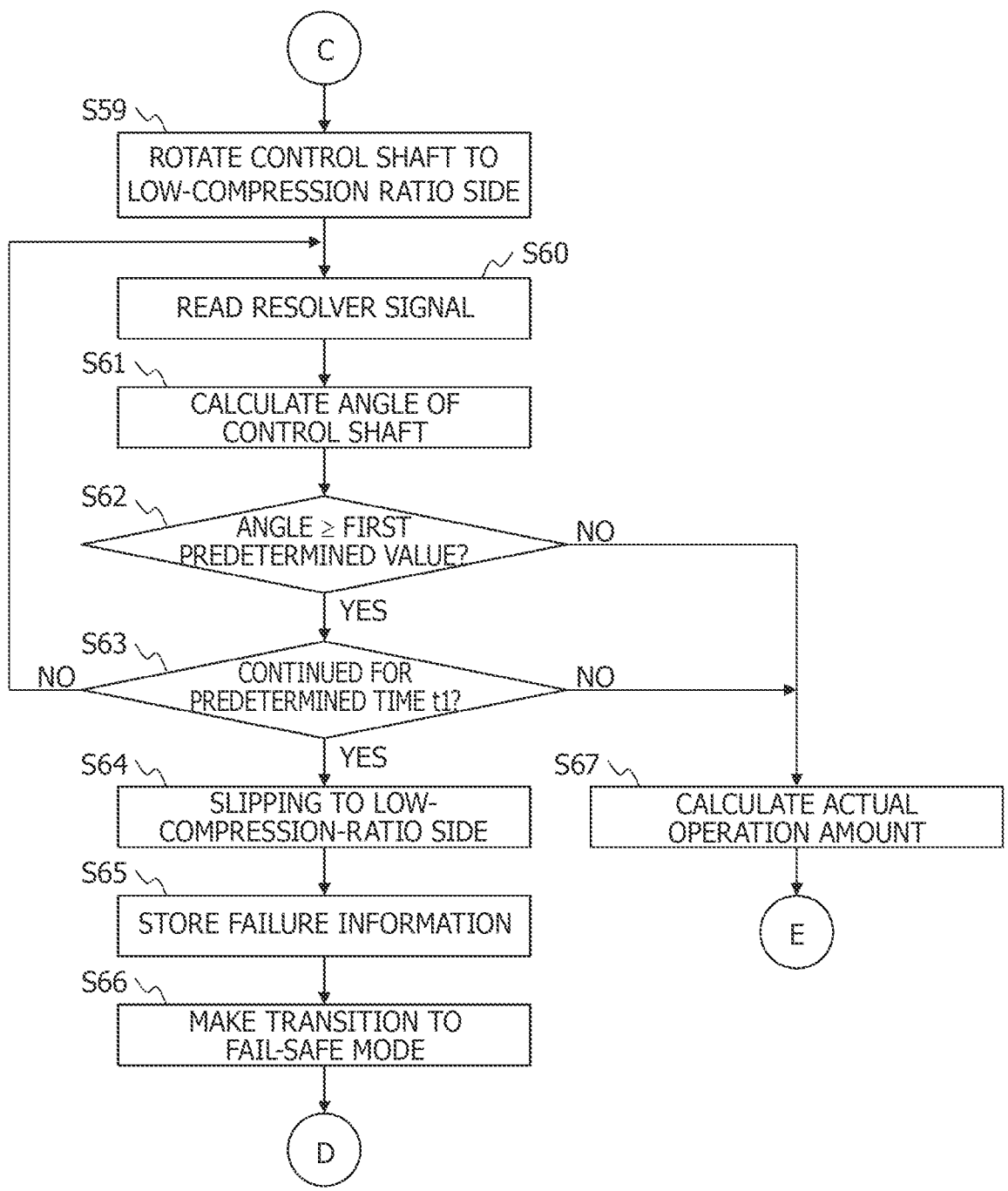
FIG. 11 is a flowchart showing the example of the stop processing.
Figure 12:
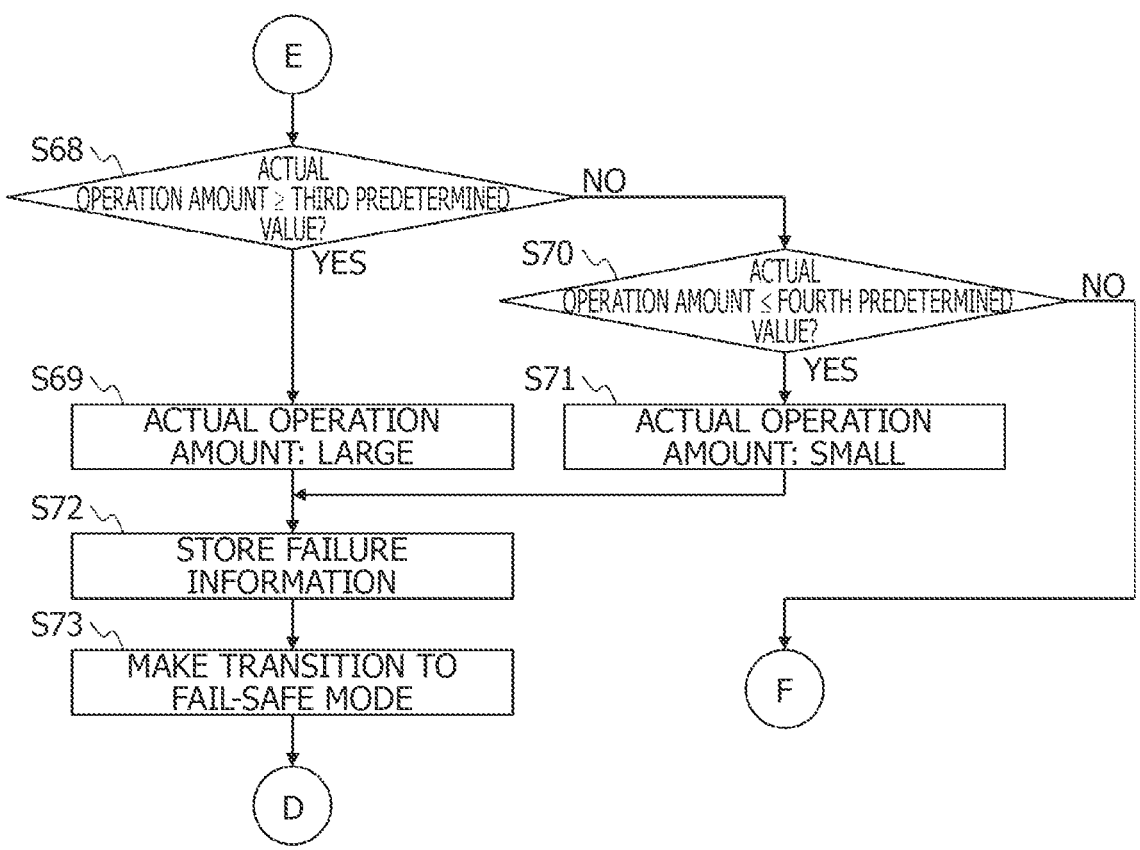
FIG. 12 is a flowchart showing the example of the stop processing.
Figure 13:
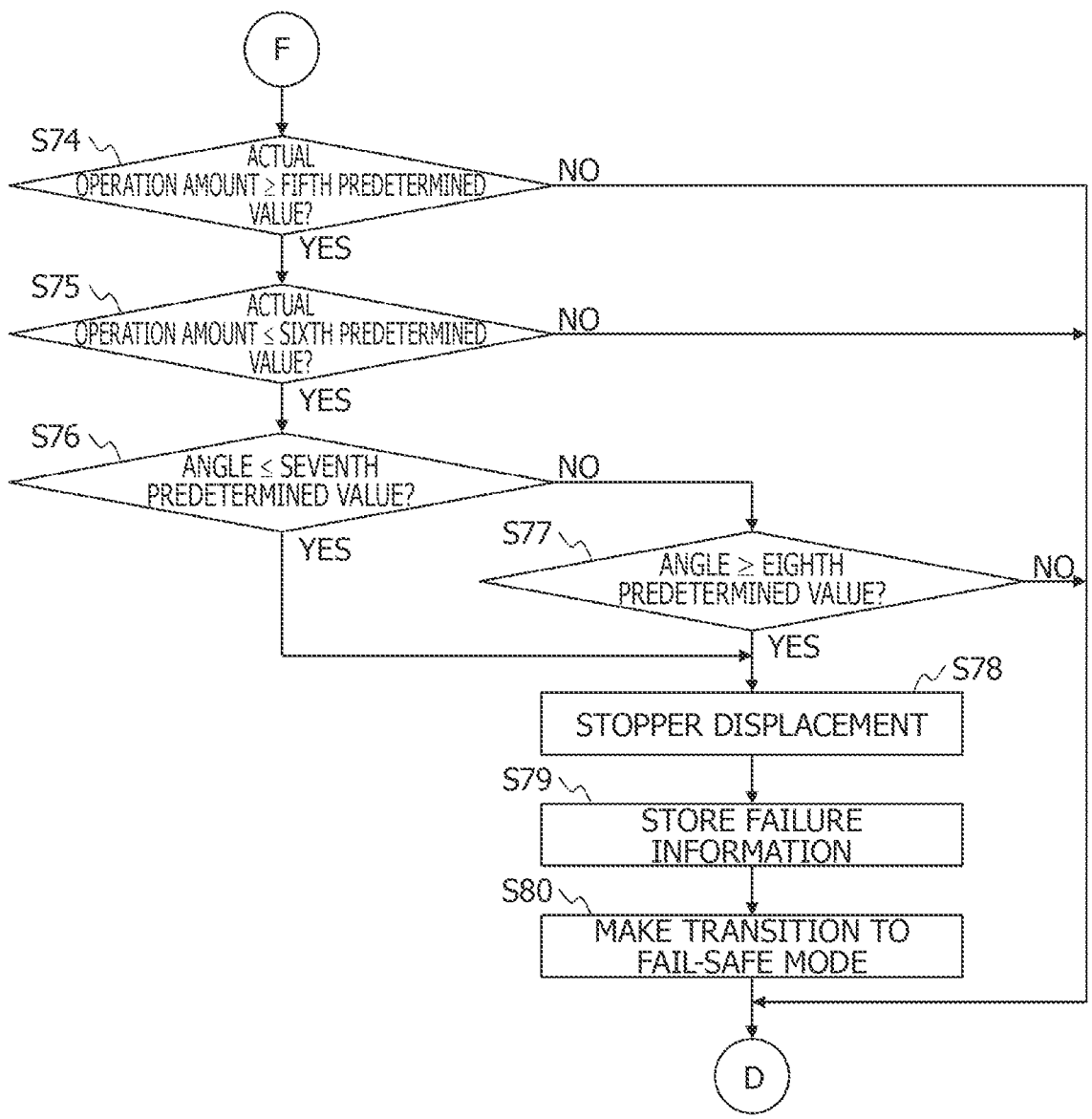
FIG. 13 is a flowchart showing the example of the stop processing.

If control shaft 226 is not slipping with respect to the output shaft of reducer 228A, as indicated in FIG. 9, microcomputer 240A of VCR controller 240 determines whether the actual operation amount of control shaft 226 is too large or too small with respect to the reference operation amount (assumed value). If the actual operation amount of control shaft 226 is too large or too small with respect to the assumed value, failure information, with which it is possible to determine that the actual operation amount is too large or too small, is stored in the nonvolatile memory, and the control of VCR mechanism 220 makes a transition to the fail-safe mode in order to secure safety in a vehicle operation. Such a diagnosis is conducted when the compression ratio of engine 100 reaches the maximum compression ratio of normal control range RNG1. This can shorten a time for rotating control shaft 226 to stopper mechanism 230 on the high-compression-ratio side and reduce the influence of engine 100 on the request torque.

When the compression ratio of engine 100 is not the maximum compression ratio of normal control range RNG1, microcomputer 240A of VCR controller 240 performs feedback control on actuator 228 such that the rotation angle of control shaft 226 approaches the target angle. Hence, VCR mechanism 220 can be controlled to have a compression ratio corresponding to an engine operating state, thereby improving an power output and fuel efficiency.

FIGS. 10 to 13 indicate an example of stop processing performed by microcomputer 240A of VCR controller 240 when engine 100 is stopped. It is assumed that engine 100 is stopped, for example, when an ignition switch is turned off, an engine stop command is received from an idling reduction system, or a transition is made to driving only with a drive motor. Microcomputer 240A of VCR controller 240 performs the stop processing according to an application program stored in the nonvolatile memory.

In step 50, microcomputer 240A of VCR controller 240 rotates control shaft 226 to the high-compression-ratio side by outputting a driving signal to actuator 228 of VCR mechanism 220.

In step 51, microcomputer 240A of VCR controller 240 reads the output signals of resolver 310 (sine wave signal and cosine wave signal).

In step 52, microcomputer 240A of VCR controller 240 determines the rotation angle of control shaft 226 from the output signals of resolver 310 and the reference position.

In step 53, microcomputer 240A of VCR controller 240 determines whether the rotation angle of control shaft 226 is equal to or less than the second predetermined value. When determining that the rotation angle of control shaft 226 is equal to or less than the second predetermined value (Yes), microcomputer 240A of VCR controller 240 advances the processing to step 54. When determining that the rotation angle of control shaft 226 is greater than the second predetermined value (No), microcomputer 240A of VCR controller 240 advances the processing to step 58.

In step 54, microcomputer 240A of VCR controller 240 determines whether the rotation angle of control shaft 226 has been kept at the second predetermined value or less for predetermined time t2. When determining that the rotation angle of control shaft 226 has been kept at the second predetermined value or less for predetermined time t2 (Yes), microcomputer 240A of VCR controller 240 advances the processing to step 55. When determining that the rotation angle of control shaft 226 has not been kept at the second predetermined value or less for predetermined time t2 (No), microcomputer 240A of VCR controller 240 returns the processing to step 51.

In step 55, since the rotation angle of control shaft 226 has been kept at the second predetermined value or less for predetermined time t2, microcomputer 240A of VCR controller 240 diagnoses that slipping has occurred on control shaft 226 to the high-compression-ratio side.

In step 56, microcomputer 240A of VCR controller 240 writes and stores failure information, with which it is possible to determine the occurrence of slipping on control shaft 226 to the high-compression-ratio side, in nonvolatile memory.

In step 57, microcomputer 240A of VCR controller 240 causes the control of VCR mechanism 220 to make a transition to the fail-safe mode. Microcomputer 240A of VCR controller 240 then terminates the stop processing.

In step 58, microcomputer 240A of VCR controller 240 temporarily stores the rotation angle of control shaft 226 in a state in which the rotation of control shaft 226 to the high-compression-ratio side is restricted by stopper mechanism 230.

In step 59, microcomputer 240A of VCR controller 240 rotates control shaft 226 to the low-compression-ratio side by outputting a driving signal to actuator 228 of VCR mechanism 220.

In step 60, microcomputer 240A of VCR controller 240 reads the output signals of resolver 310 (sine wave signal and cosine wave signal).

In step 61, microcomputer 240A of VCR controller 240 determines the rotation angle of control shaft 226 from the output signals of resolver 310 and the reference position.

In step 62, microcomputer 240A of VCR controller 240 determines whether the rotation angle of control shaft 226 is equal to or greater than the first predetermined value. When determining that the rotation angle of control shaft 226 is equal to or greater than the first predetermined value (Yes), microcomputer 240A of VCR controller 240 advances the processing to step 63. When determining that the rotation angle of control shaft 226 is less than the first predetermined value (No), microcomputer 240A of VCR controller 240 advances the processing to step 67.

In step 63, microcomputer 240A of VCR controller 240 determines whether the rotation angle of control shaft 226 has been kept at the first predetermined value or greater for predetermined time t1. When determining that the rotation angle of control shaft 226 has been kept at the first predetermined value or greater for predetermined time t1 (Yes), microcomputer 240A of VCR controller 240 advances the processing to step 64. When determining that the rotation angle of control shaft 226 has not been kept at the first predetermined value or greater for predetermined time t1 (No), microcomputer 240A of VCR controller 240 returns the processing to step 60.

In step 64, since the rotation angle of control shaft 226 has been kept at the first predetermined value or greater for predetermined time t1, microcomputer 240A of VCR controller 240 diagnoses that slipping has occurred on control shaft 226 to the low-compression-ratio side.

In step 65, microcomputer 240A of VCR controller 240 writes and stores failure information, with which it is possible to determine the occurrence of slipping on control shaft 226 to the low-compression-ratio side, in nonvolatile memory.

In step 66, microcomputer 240A of VCR controller 240 causes the control of VCR mechanism 220 to make a transition to the fail-safe mode. Thereafter, microcomputer 240A of VCR mechanism 220 terminates the stop processing.

In step 67, microcomputer 240A of VCR controller 240 calculates the actual operation amount of control shaft 226 by subtracting the temporarily stored rotation angle of control shaft 226 in step 58 from the calculated rotation angle of control shaft 226 in step 61.

In step 68, microcomputer 240A of VCR controller 240 determines whether the actual operation amount of control shaft 226 is equal to or greater than the third predetermined value. When determining that the actual operation amount of control shaft 226 is equal to or greater than the third predetermined value (Yes), microcomputer 240A of VCR controller 240 advances the processing to step 69. When determining that the actual operation amount of control shaft 226 is less than the third predetermined value (No), microcomputer 240A of VCR controller 240 advances the processing to step 70.

In step 69, microcomputer 240A of VCR controller 240 diagnoses that the actual operation amount of control shaft 226 is too large. Thereafter, microcomputer 240A of VCR controller 240 advances the processing to step 72.

In step 70, microcomputer 240A of VCR controller 240 determines whether the actual operation amount of control shaft 226 is equal to or less than the fourth predetermined value. When determining that the actual operation amount of control shaft 226 is equal to or less than the fourth predetermined value (Yes), microcomputer 240A of VCR controller 240 advances the processing to step 71. When determining that the actual operation amount of control shaft 226 is greater than the fourth predetermined value (No), microcomputer 240A of VCR controller 240 advances the processing to step 74.

In step 71, microcomputer 240A of VCR controller 240 diagnoses that the actual operation amount of control shaft 226 is too small. Thereafter, microcomputer 240A of VCR controller 240 advances the processing to step 72.

In step 72, microcomputer 240A of VCR controller 240 writes and stores failure information, with which it is possible to determine that the actual operation amount of control shaft 226 is too large or too small, in nonvolatile memory.

In step 73, microcomputer 240A of VCR controller 240 causes the control of VCR mechanism 220 to make a transition to the fail-safe mode. Microcomputer 240A of VCR controller 240 then terminates the stop processing.

In step 74, microcomputer 240A of VCR controller 240 determines whether the actual operation amount of control shaft 226 is equal to or greater than a fifth predetermined value. In this case, the fifth predetermined value is one of threshold values for diagnosing the presence or absence of a displacement of control shaft 226 with respect to stopper mechanism 230. For example, the fifth predetermined value is properly set by adding a correction value to the reference operation amount in consideration of variations among components. The correction value is properly set by integrating, for example, tolerances of the components of VCR mechanism 220. When determining that the actual operation amount of control shaft 226 is equal to or greater than the fifth predetermined value (Yes), microcomputer 240A of VCR controller 240 advances the processing to step 75. When determining that the actual operation amount of control shaft 226 is less than the fifth predetermined value (No), microcomputer 240A of VCR controller 240 terminates the stop processing. The fifth predetermined value may be equal to the fourth predetermined value.

In step 75, microcomputer 240A of VCR controller 240 determines whether the actual operation amount of control shaft 226 is equal to or less than a sixth predetermined value. In this case, the sixth predetermined value is one of the threshold values for diagnosing the presence or absence of a displacement of control shaft 226 with respect to stopper mechanism 230. For example, the sixth predetermined value is properly set by adding a correction value to the reference operation amount in consideration of variations among components. The correction value is properly set by integrating, for example, tolerances of the components of VCR mechanism 220. When determining that the actual operation amount of control shaft 226 is equal to or less than the sixth predetermined value (Yes), microcomputer 240A of VCR controller 240 advances the processing to step 76. When determining that the actual operation amount of control shaft 226 is greater than the sixth predetermined value (No), microcomputer 240A of VCR controller 240 terminates the stop processing. The sixth predetermined value may be equal to the third predetermined value.

In step 76, microcomputer 240A of VCR controller 240 determines whether the rotation angle of control shaft 226 is equal to or less than a seventh predetermined value in a state in which the rotation of control shaft 226 to the high-compression-ratio side is restricted by stopper mechanism 230. In this case, the seventh predetermined value is one of threshold values for diagnosing the presence or absence of a displacement of control shaft 226 with respect to stopper mechanism 230. For example, the seventh predetermined value is properly set in consideration of the resolution of resolver 310 and the accuracy of angle calculation. When determining that the rotation angle of control shaft 226 is equal to or less than the seventh predetermined value (Yes), microcomputer 240A of VCR controller 240 advances the processing to step 78. When determining that the rotation angle of control shaft 226 is greater than the seventh predetermined value (No), microcomputer 240A of VCR controller 240 advances the processing to step 77.

In step 77, microcomputer 240A of VCR controller 240 determines whether the rotation angle of control shaft 226 is equal to or greater than an eighth predetermined value in a state in which the rotation of control shaft 226 to the low-compression-ratio side is restricted by stopper mechanism 230. In this case, the eighth predetermined value is one of threshold values for diagnosing the presence or absence of a displacement of control shaft 226 with respect to stopper mechanism 230. For example, the eighth predetermined value is properly set in consideration of the resolution of resolver 310 and the accuracy of angle calculation. When determining that the rotation angle of control shaft 226 is equal to or greater than the eighth predetermined value (Yes), microcomputer 240A of VCR controller 240 advances the processing to step 78. When determining that the rotation angle of control shaft 226 is less than the eighth predetermined value (No), microcomputer 240A of VCR controller 240 terminates the stop processing.

In step 78, although the actual operation amount of control shaft 226 falls within the range of the reference operation amount with a predetermined margin, control shaft 226 rotates over stopper mechanism 230 to the high-compression-ratio side or the low-compression ratio side. Thus, microcomputer 240A of VCR controller 240 diagnoses that the relative angle of control shaft 226 is displaced with respect to stopper mechanism 230, that is, a stopper displacement has occurred.

In step 79, microcomputer 240A of VCR controller 240 writes and stores failure information, with which it is possible to determine the occurrence of a stopper displacement, in nonvolatile memory.

In step 80, microcomputer 240A of VCR controller 240 causes the control of VCR mechanism 220 to make a transition to the fail-safe mode. Thereafter, microcomputer 240A of VCR mechanism 220 terminates the stop processing.

Figure 14:
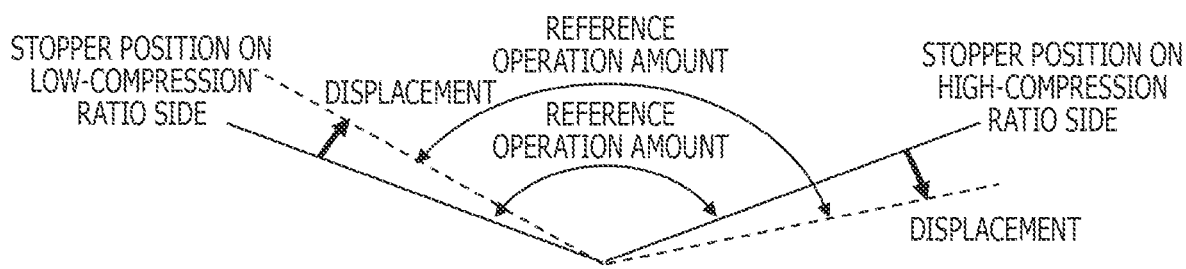
FIG. 14 is an explanatory drawing of a state in which the control shaft is displaced from the stopper mechanism.

According to the stop processing, when engine 100 is stopped, microcomputer 240A of VCR controller 240 diagnoses a stopper displacement in addition to diagnoses of slipping of control shaft 226 and the actual operation amount of control shaft 226. Specifically, in the event of a stopper displacement, the actual operation amount of control shaft 226 falls within an assumed range under the control as shown in FIG. 14. However, the relative phase of control shaft 226 changes with respect to stopper mechanism 230, and control shaft 226 rotates over stopper mechanism 230 (see broken lines). Although the actual operation amount of control shaft 226 falls within the range of the reference operation amount with a predetermined margin, microcomputer 240A of VCR controller 240 can diagnose the presence or absence of a stopper displacement depending upon whether control shaft 226 has rotated over stopper mechanism 230 to the high-compression-ratio side or the low-compression ratio side.

In the event of a stopper displacement, the rotation angle of control shaft 226 is offset to the low-compression-ratio side or the high-compression-ratio side, the rotation angle being determined from the output signals of resolver 310 and the reference position, which makes it difficult to control VCR mechanism 220 to a target compression ratio. Thus, in the event of a stopper displacement, the stopper displacement is written and stored as failure information in nonvolatile memory, and VCR mechanism 220 is controlled in the fail-safe mode.

Figure 15:
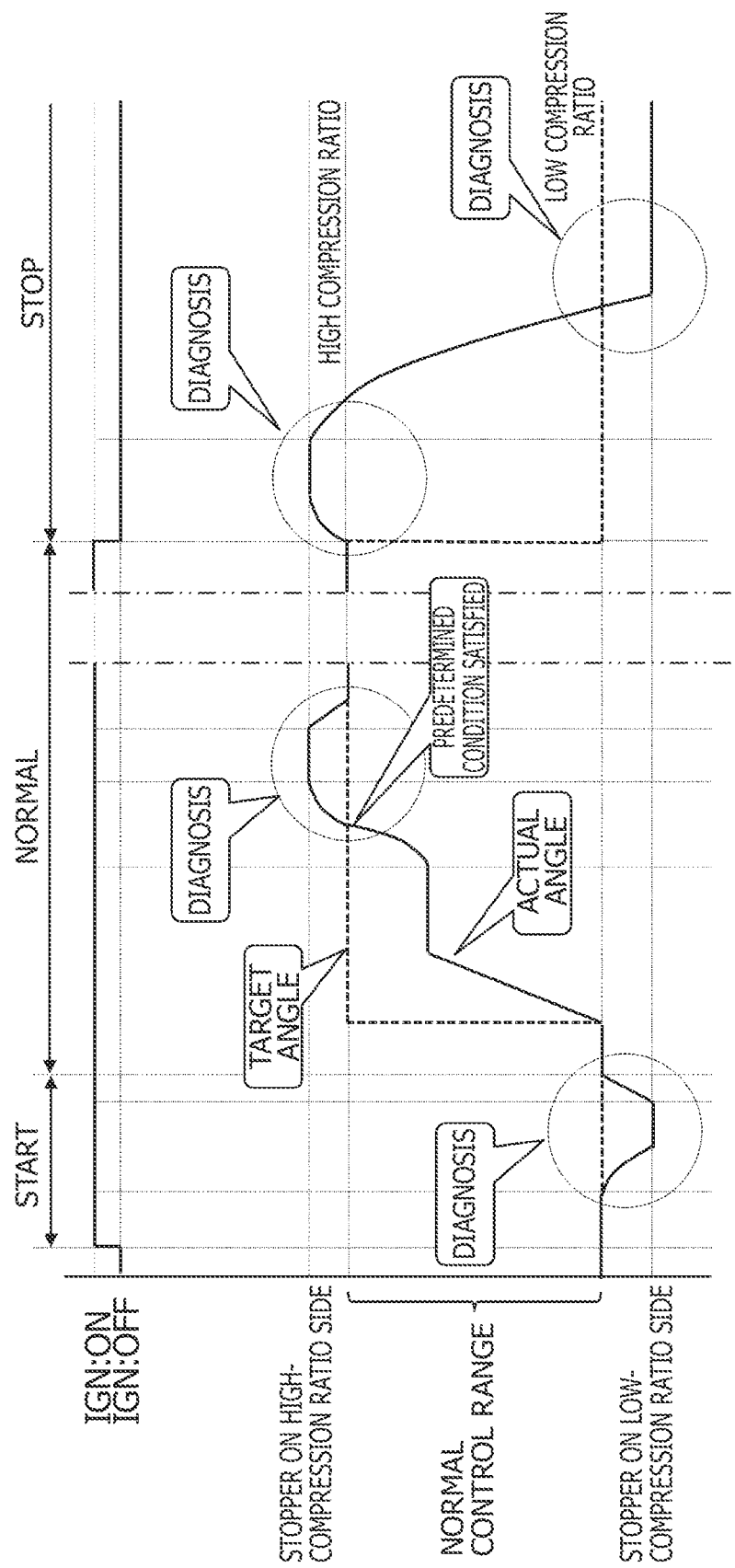
FIG. 15 is an explanatory drawing indicating a series of processing steps from the start to the stop of the engine on a time-series basis.

In order to enhance understanding of the present embodiment, a series of diagnosis processing steps from the start to the stop of engine 100 will be described below with reference to FIG. 15.

When an ignition switch is turned on, microcomputer 240A of VCR controller 240 rotates control shaft 226 of VCR mechanism 220 to the low-compression-ratio side. When engine 100 is stopped, the compression ratio of engine 100 is changed to a low compression ratio, which is suitable for starting, in preparation for the restart of the engine. Thus, only a small change is necessary for the angle of rotation of control shaft 226 to stopper mechanism 230 on the low-compression-ratio side, thereby shortening a time from the start to cranking. In this state, it is diagnosed whether control shaft 226 is slipping to the low-compression-ratio side with respect to the output shaft of reducer 228A.

At the completion of a diagnosis of slipping on control shaft 226, engine 100 is cranked into a state of complete combustion, and microcomputer 240A of VCR controller 240 make a transition to normal control in which the rotation angle of control shaft 226 is controlled in response to a target angle from engine controller 260. When the predetermined condition in which control shaft 226 has reached the maximum compression ratio of normal control range RNG1 is satisfied, microcomputer 240A of VCR controller 240 rotates control shaft 226 of VCR mechanism 220 to the high-compression-ratio side. In this state, it is diagnosed whether control shaft 226 is slipping to the high-compression-ratio side with respect to the output shaft of reducer 228A. At this point, a change of the rotation angle of rotating control shaft 226 to stopper mechanism 230 on the high-compression-ratio side is small and a torque required for engine 100 is relatively small. This can shorten a diagnosis time and suppress influence on the operating state of engine 100.

When the ignition switch is turned off, microcomputer 240A of VCR controller 240 rotates control shaft 226 of VCR mechanism 220 to the high-compression-ratio side. Since the requested torque is small immediately before engine 100 is stopped, it can be assumed that control shaft 226 has reached the maximum compression ratio of normal control range RNG1. Thus, only a small change is necessary for the angle of rotation of control shaft 226 to stopper mechanism 230 on the high-compression-ratio side. In this state, it is diagnosed whether control shaft 226 is slipping to the high-compression-ratio side with respect to the output shaft of reducer 228A.

At the completion of a diagnosis of slipping on control shaft 226 to the high-compression-ratio side, microcomputer 240A of VCR controller 240 rotates control shaft 226 of VCR controller 240 to the low-compression-ratio side in preparation for the restart of engine 100. In this state, it is diagnosed whether control shaft 226 is slipping to the low-compression-ratio side with respect to the output shaft of reducer 228A. In addition to the diagnosis of slipping, the actual operation amount of control shaft 226 by stopper mechanism 230 can be specified, so that, by using the actual operation amount as a parameter, the actual operation amount of control shaft 226 is diagnosed and a stopper displacement is diagnosed.

In this way, the diagnosis function can be integrated so as to minimize the influence on the control of VCR mechanism 220.

One skilled in the art can easily understand that another embodiment can be made by omitting some of the technical ideas of the various embodiments, properly combining some of the technical ideas, or replacing some of the technical ideas with a known technique.

For example, the diagnosis of control shaft 226 is not limited to a slipping diagnosis, an actual operation amount diagnosis, and a stopper displacement diagnosis and may be at least one of these diagnoses. With a sufficient time, control shaft 226 may be rotated to the high-compression-ratio side to conduct a slipping diagnosis at the start of engine 100. Furthermore, after the complete combustion of engine 100, control shaft 226 may be rotated to the low-compression-ratio side to conduct a slipping diagnosis when control shaft 226 reaches the minimum compression ratio in normal control range RNG1.

REFERENCE SYMBOL LIST

100 Engine (internal combustion engine)
220 VCR mechanism (variable compression ratio mechanism)
226 Control shaft
228 Actuator
230 Stopper mechanism
240 VCR controller (control device)
310 Resolver (angle sensor)

The invention claimed is:

1. A control device for a variable compression ratio mechanism for changing a compression ratio of an internal combustion engine by rotating a control shaft connected to an output shaft of an actuator, wherein
the control device is configured to:
with respect to a reference position, determine a rotation angle of the control shaft by sequentially integrating output values of an angle sensor that detects a rotation angle of the output shaft of the actuator in a range of 0° to 360°, and control the actuator such that the rotation angle of the control shaft approaches a target angle, and
when the internal combustion engine is stopped, rotate the control shaft to a high-compression-ratio side and a low-compression-ratio side, respectively, toward a stopper mechanism that defines a rotatable range of the control shaft, and compare the determined rotation angle of the control shaft and a reference operation angle to diagnose whether a failure has occurred in the variable compression ratio mechanism.

2. The control device for the variable compression ratio mechanism according to claim 1, wherein at startup, the control device is configured to rotate the control shaft to the low-compression-ratio side toward the stopper mechanism and compare the determined rotation angle of the control shaft and the reference operation angle to diagnose whether a failure has occurred in the variable compression ratio mechanism.

3. The control device for the variable compression ratio mechanism according to claim 1, wherein when an operating state of the internal combustion engine satisfies a predetermined condition, the control device is configured to rotate the control shaft to the high-compression-ratio side toward the stopper mechanism and compare the determined rotation angle of the control shaft and the reference operation angle to diagnose whether a failure has occurred in the variable compression ratio mechanism.

4. The control device for the variable compression ratio mechanism according to claim 3, wherein the predetermined condition is a condition in which a compression ratio of the internal combustion engine reaches a maximum compression ratio under control.

5. The control device for the variable compression ratio mechanism according to claim 1, wherein when it is diagnosed that a failure has occurred in the variable compression ratio mechanism, the control device is configured to control the variable compression ratio mechanism in a fail-safe mode.

6. The control device for the variable compression ratio mechanism according to claim 5, wherein in the fail-safe mode, the control device is configured to rotate the control shaft in a predetermined restricted range or holds the variable compression ratio mechanism on the low-compression-ratio side under control.

7. The control device for the variable compression ratio mechanism according to claim 1, wherein when the determined rotation angle of the control shaft deviates from the reference operation angle, when the determined rotation angle of the control shaft continuously exceeds the reference operation angle for a predetermined time, or when the determined rotation angle of the control shaft is displaced from the reference operation angle, the control device is configured to diagnose that a failure has occurred in the variable compression ratio mechanism.

8. A diagnostic method for a variable compression ratio mechanism for changing a compression ratio of an internal combustion engine by rotating a control shaft connected to an output shaft of an actuator, wherein
with respect to a reference position, a control device determines a rotation angle of the control shaft by sequentially integrating output values of an angle sensor that detects a rotation angle of the output shaft of the actuator in a range of 0° to 360°, and controls the actuator such that the rotation angle of the control shaft approaches a target angle, and
when the internal combustion engine is stopped, the control device rotates the control shaft to a high-compression-ratio side and a low-compression-ratio side, respectively, toward a stopper mechanism that defines a rotatable range of the control shaft, and compares the determined rotation angle of the control shaft and a reference operation angle to diagnose whether a failure has occurred in the variable compression ratio mechanism.

9. The diagnostic method for a variable compression ratio mechanism according to claim 8, wherein at startup, the control device rotates the control shaft to the low-compression-ratio side toward the stopper mechanism and compares the determined rotation angle of the control shaft and the reference operation angle to diagnose whether a failure has occurred in the variable compression ratio mechanism.

10. The diagnostic method for a variable compression ratio mechanism according to claim 8, wherein when an operating state of the internal combustion engine satisfies a predetermined condition, the control device rotates the control shaft to the high-compression-ratio side toward the stopper mechanism and compares the determined rotation angle of the control shaft and the reference operation angle to diagnose whether a failure has occurred in the variable compression ratio mechanism.

11. The diagnostic method for a variable compression ratio mechanism according to claim 10, wherein the predetermined condition is a condition in which a compression ratio of the internal combustion engine reaches a maximum compression ratio under control.

12. The diagnostic method for a variable compression ratio mechanism according to claim 8, wherein when it is diagnosed that a failure has occurred in the variable compression ratio mechanism, the control device controls the variable compression ratio mechanism in a fail-safe mode.

13. The diagnostic method for a variable compression ratio mechanism according to claim 12, wherein as the fail-safe mode, the control device rotates the control shaft in a predetermined restricted range or holds the variable compression ratio mechanism on the low-compression-ratio side under control.

14. The diagnostic method for a variable compression ratio mechanism according to claim 8, wherein when the determined rotation angle of the control shaft deviates from the reference operation angle, when the determined rotation angle of the control shaft continuously exceeds the reference operation angle for a predetermined time, or when the determined rotation angle of the control shaft is displaced from the reference operation angle, the control device diagnoses that a failure has occurred in the variable compression ratio mechanism.

* * * * *